W. H. Haines,
Egg Beater.
No. 99,883. Patented Feb. 15, 1870.
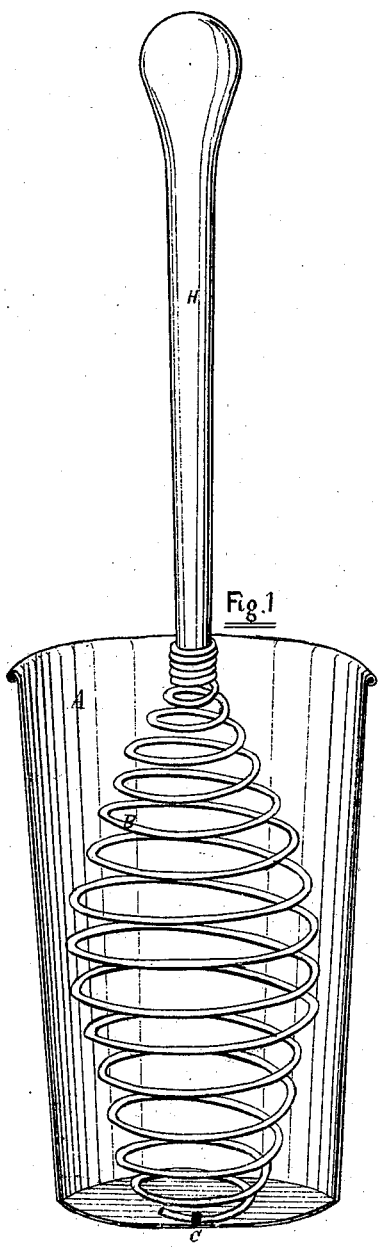
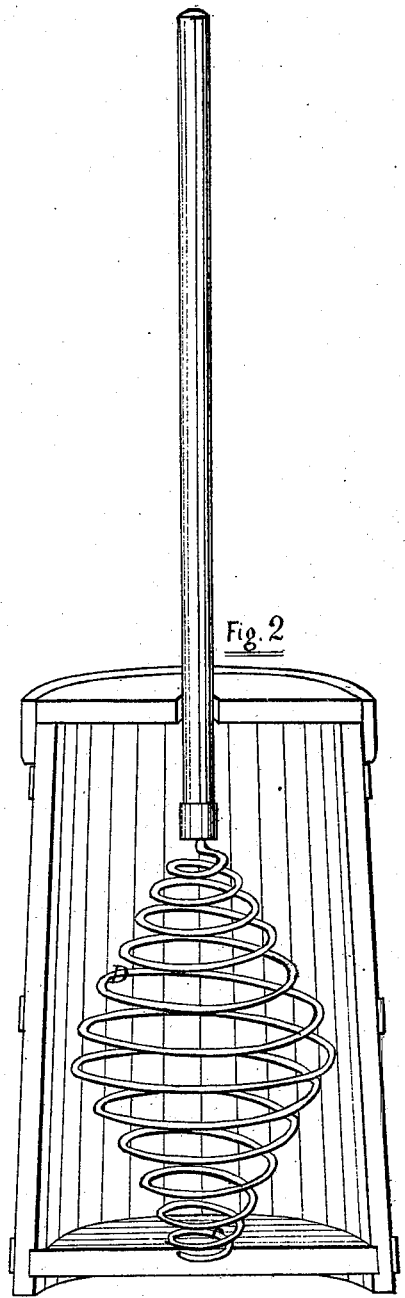
Witness
Inventor
W. H. Haines

United States Patent Office.

WILLIAM HENRY HAINES, OF NEWARK, NEW JERSEY, ASSIGNOR FOR ONE-HALF OF HIS RIGHT TO THOMAS ALBERT SANDFORD, OF SAME PLACE.

Letters Patent No. 99,883, dated February 15, 1870.

IMPROVED EGG-BEATER, &c.

The Schedule referred to in these Letters Patent and making part of the same.

I, WILLIAM HENRY HAINES, of the city of Newark, county of Essex, and State of New Jersey, have invented certain Improvements in Egg-Beaters and Churns, which can also be used for a variety of other useful purposes, in mixing fluid and semi-fluid materials required in various arts, of which the following is a specification, together with the annexed drawings, of which—

Figure 1 is a full-sized drawing of an egg-beater, drawn with one side open, in order to show the interior, and Figure 2 is a scale drawing of a churn, with one side open, in order to show the interior; and The following is a full and complete description thereof, with its mode of operation.

A, fig. 1, is a vessel, made of tin or other suitable material, and B is a duplex conoidal spring, made of steel, iron, or other suitable wire, and attached to the bottom of the vessel at C, and having a handle, H, attached to the upper end. Now, if we put the contents of say from three to six eggs inside the vessel, and taking hold of the handle H, contract and expand the spring rapidly, the eggs will be alternately forced within the duplex conoidal spring, and out again, and in a few minutes will be sufficiently divided and beaten for all necessary purposes.

Fig. 2 represents a churn drawn to a scale of about three inches to one foot, and D is a duplex conoidal spring, made of suitable wire, and fastened to the bottom. Now, if a quantity of suitable milk is put into the churn, and the duplex conoidal spring D is rapidly expanded and contracted, the milk will be considerably agitated, and in a short time butter will be formed.

It will be evident that the same means can be usefully employed in mixing flour for paste, and a variety of other purposes, where thorough mixing and dividing are required.

I do not claim the single conoidal spring, as that has been done before, neither do I claim the metallic or wooden vessels; but

I claim the duplex conoidal spring, combined with the metallic or wooden vessel, attached together, as shown in the drawings annexed, for the purposes heretofore mentioned and described.

W. H. HAINES.

Witnesses:
FENN WILLCOX,
WM. S. HENSON.